US007000030B2

(12) United States Patent
Räsänen et al.

(10) Patent No.: US 7,000,030 B2
(45) Date of Patent: Feb. 14, 2006

(54) INTERWORKING METHOD AND APPARATUS

(75) Inventors: Juha Räsänen, Vantaa (FI); Mikko Ohvo, Numminen (FI)

(73) Assignee: Nokia Networks Oy, Espoo (FI)

( * ) Notice: Subject to any disclaimer, the term of this patent is extended or adjusted under 35 U.S.C. 154(b) by 640 days.

(21) Appl. No.: 10/008,783

(22) Filed: Nov. 13, 2001

(65) Prior Publication Data

US 2002/0069297 A1    Jun. 6, 2002

Related U.S. Application Data

(63) Continuation of application No. PCT/EP99/03611, filed on May 25, 1999.

(51) Int. Cl.
*G06F 15/16* (2006.01)

(52) U.S. Cl. .................. 709/246; 709/227; 370/466

(58) Field of Classification Search ............ 709/217, 709/218, 227–228, 230, 238, 246; 370/295.7, 370/410, 352, 466

See application file for complete search history.

(56) References Cited

U.S. PATENT DOCUMENTS

| 5,822,367 | A |   | 10/1998 | Koshino et al. |         |
|-----------|---|---|---------|----------------|---------|
| 5,909,648 | A | * | 6/1999  | Boudreaux et al. | 455/422.1 |
| 5,917,816 | A | * | 6/1999  | Jacobsohn      | 370/352 |
| 6,073,018 | A | * | 6/2000  | Sallberg       | 455/435.2 |
| 6,421,346 | B1 | * | 7/2002  | Itoh et al.    | 370/395.7 |
| 6,453,174 | B1 | * | 9/2002  | Cunningham et al. | 455/560 |
| 6,483,837 | B1 | * | 11/2002 | Howell et al.  | 370/395.3 |

FOREIGN PATENT DOCUMENTS

| DE | 19604049   | 10/1997 |
|----|------------|---------|
| WO | WO 99/27691 | 3/1999  |

OTHER PUBLICATIONS

Toga et al, "ITU-T Standardization Activities for Interactive Multimedia Communications on Packet-based Networks : H.323 and Related Recommendations", Computer Networks and ISDN Systems, vol. 31, No. 3, pp. 205-223, Feb. 11, 1999.*

Toga, et al; "ITU-T Standardization Activities For Interaction Multimedia Communications on Packet-based Networks: H.323 and Related Recommendations," Computer Networks and ISDN Systems, vol. 31, No. 3 (Feb. 11, 1999), pp. 205-223.

* cited by examiner

*Primary Examiner*—Philip B. Tran
(74) *Attorney, Agent, or Firm*—Squire, Sanders & Dempsey L.L.P.

(57) ABSTRACT

The invention relates to an interworking method and apparatus for a data connection between a first terminal supporting a first processing scheme and a second terminal supporting a second processing scheme, wherein the first and second processing schemes are checked, and the first processing scheme is adapted to the second processing scheme, when the checking indicates that the first processing scheme is not supported by the second terminal. Thus, a mapping is performed and different processing capabilities are used on different portions of the data connection.

20 Claims, 3 Drawing Sheets

INTERWORKING METHOD AND APPARATUS

This application is a continuation of PCT/EP99/03611, filed May 25, 1999.

FIELD OF THE INVENTION

The present invention relates to an interworking method and apparatus for a data connection, such as a multimedia connection, between a first terminal supporting a first signal processing scheme and a second terminal supporting a second signal processing scheme.

BACKGROUND OF THE INVENTION

In recent years, multimedia telephone terminals which can be connected to fixed networks have been developed. These terminals provide real-time video, audio, or data, or any combination thereof, between two multimedia telephone terminals over a voice band network connection. Communication may be either one-way or two-way. A multipoint communication using a separate Multipoint Control Unit (MCU) among more than two terminals is also possible. Furthermore, the multimedia telephone terminals can be integrated into PCs or workstations, or can be stand-alone units.

Interworking with visual telephone systems on mobile radio networks is defined in the ITU-T video/multimedia recommendation H.324/M. The logical unit of information exchange between a multiplex layer and an underlying physical layer is the Multiplex-Protocol Data Unit (MUX-PDU). The MUX-PDU is a packet framed by High-Level Data Link Control (HDLC) flags and using a HDLC zero-bit insertion for transparency.

According to the above video/multimedia recommendation, three levels of error correction measures or schemes are provided in order to improve the robustness, i.e. error resilience, of the multiplexed audio video or data frame, wherein level 3 provides the best error resilience. The three levels are defined as follows:

Level 1: the HDLC flag is replaced by a longer flag, HDLC bit stuffing is not used;
Level 2: the MUX-PDU header contains an error protection (in addition to the level 1 measures);
Level 3: the PDU content is error-protected (in addition to the level 2 measures).

The details of the above measures corresponding to the levels 1 to 3 are described in annexes A, B and C, respectively, of the ITU-T Recommendation H.223.

The used level is negotiated in-band between the video terminals. If either of the video terminals does not support any of the above levels, a default level is used, defined as level 0.

However, current terminals often do not support the above defined error correction schemes. Moreover, in future, there may be new error correction schemes to further improve the error resilience of the video/multimedia frames in mobile environments. This means that there will in practice be a spectrum of video terminals with various levels (from level 0 to the highest level) of error correction.

Furthermore, a huge spectrum of specifications is used in fixed networks for defining multimedia or video calls with various protocols, transfer capabilities and ways of signaling, e.g. ITU-T H series recommendations and V series recommendations.

In fixed networks, terminals set up a call and negotiate on parameters with inband procedures defined in V.8, V.8bis and V.140.

Thus, flexible interworking is required between different networks, such as mobile and a fixed network, in order to support various services.

SUMMARY OF THE INVENTION

It is therefore an object of the present invention to provide an interworking method and apparatus by means of which the support of various services can be assured.

This object is achieved by an interworking method for a data connection between a first terminal supporting a first processing scheme and a second terminal supporting a second processing scheme, comprising the steps of:
checking the first and second processing schemes; and
providing an interworking function for adapting said first processing scheme to said second processing scheme, when said checking step indicates that the first processing scheme is not supported by the second terminal.

Furthermore, the above object is achieved by an interworking apparatus for performing an interworking in a data connection between a first terminal supporting a first processing scheme and a second terminal supporting a second processing scheme, comprising:
checking means for checking the first and second processing schemes; and
adaptation means for adapting the first processing scheme to the second processing scheme, when the checking means determines that the first processing scheme is not supported by the second terminal.

Accordingly, a mapping is provided for adapting various video phone or multimedia implementations between mobile and fixed networks terminals and for setting up a call through mobile networks even in cases where the terminals are not able to negotiate with inband procedures. The processing schemes, e.g. error correction levels or protocol specifications, of the terminals are checked during an intermediate processing which may be performed by an interworking function. If the processing scheme used on a first transmission leg leading to the first terminal cannot be used on the other transmission leg leading to the second terminal, different processing schemes are used on the two legs, and the intermediate processing (e.g. interworking function) performs the adaptation or mapping between the processing schemes.

Thus, an error correction having a higher robustness can be provided on the less reliable leg without modifying the other terminal having a lower robustness level.

Preferably, the checking may be performed by extracting negotiation symbols indicating the first and second processing scheme during a negotiation processing between the first and second terminals, and comparing the extracted negotiation symbols.

The bit stream via the data connection between the first and second terminals may be passed without any adaptation, when the checking indicates that the first and second processing schemes are the same scheme.

Furthermore, the negotiation symbols or information indicating the first and second processing schemes may be stored in a buffer means from which the negotiation symbols are read in order to be compared.

The first and second processing schemes may be a first and second call setup negotiation. In particular, the first call setup signaling may relate to an analog setup negotiation via a modem, and the second call setup signaling may relate to digital setup negotiation.

Alternatively, the first and second processing schemes may be a first and second error correction scheme.

In particular, the adaptation may be performed by replacing a negotiation symbol indicating a first error correction scheme by a negotiation symbol indicating a second error correction scheme, and by replacing a negotiation symbol indicating a second error correction scheme by a negotiation symbol indicating the highest common error correction scheme supported by the first terminal and the error correction function. In this case, the adaptation may be performed by converting data frames comprising the highest common error correction scheme supported by the first terminal and the error correction apparatus into data frames comprising the second error correction scheme, and by converting data frame comprising the second error correction scheme into data frames comprising the highest common error correction scheme supported by the first terminal and the error correction apparatus.

Thereby, data frames having the highest possible error correction scheme are transmitted via the respective transmission legs, and a maximum error correction level can be guaranteed.

Alternatively, the adaptation may be performed by replacing a negotiation symbol indicating the first error correction scheme by a negotiation symbol indicating the lowest available error correction scheme, and by replacing a negotiation symbol indicating the second error correction scheme by a negotiation symbol indicating the highest common error correction scheme supported by the first terminal and the error correction function. In this case, the adaptation may be performed by converting data frames comprising the highest common error correction scheme into data frames comprising the lowest available error correction scheme, and by converting data frames comprising the lowest available error correction scheme into data frames comprising the highest common error correction scheme supported by the first terminal and the error correction apparatus.

Thus, negotiation is performed in such a manner that the terminal supporting the lower error correction scheme uses the lowest available or default level, and that a good error resilience at the higher level terminal is assured.

Preferably, the interworking apparatus is a network element having an interworking function.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1:
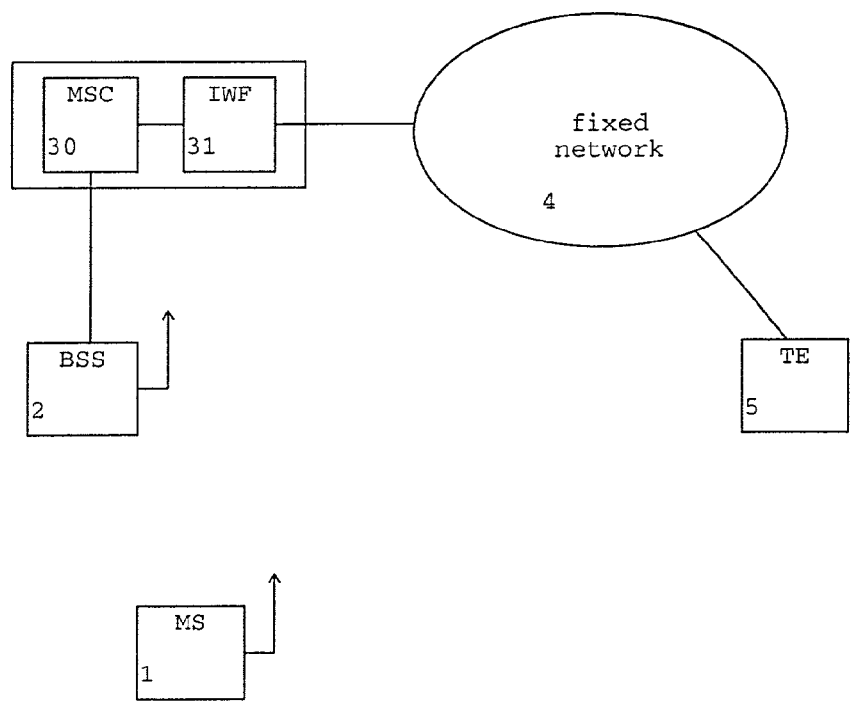
FIG. 1 shows a principle block diagram of a mobile network connected via an interworking function to a fixed network.

In the following, the present invention will be described on the basis of a preferred embodiment which relates to a multimedia connection between a fixed network and a mobile network, as shown in FIG. 1.

According to FIG. 1, a multimedia terminal equipment (TE) 5 is connected via the fixed network such as a Public Switched Telephone Network (PSTN) or the like to a mobile terminal or mobile station (MS) 1 of the mobile network.

The MS 1 is radio-connected to a Base Station Subsystem (BSS) 2 which is connected to a Mobile Switching Center (MSC) 30. At the MSC 30, an interworking function (IWF) 31 is provided for adapting protocol features used in the mobile network to protocol features used in the fixed network 4.

In case a multimedia connection is switched between the TE 5 and the MS 1 which is provided with a multimedia-capability, different processing schemes, such as different error correction levels and/or different call setup negotiation signalings may be used in the TE 5 and the MS 1.

According to the preferred embodiment of the present invention, the IWF 31 comprises an adaptation or mapping function for adapting or mapping the different processing schemes.

Figure 2:
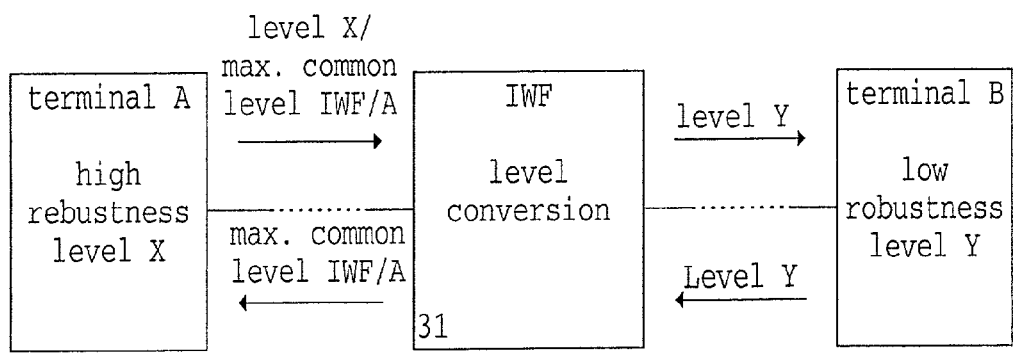
FIG. 2 shows a principle block diagram of an outline of the interworking according a first example of the preferred embodiment of the present invention.

FIG. 2 shows a principle block diagram of an outline underlying an example of the preferred embodiment of the present invention, based on an adaptation of different error correction levels. According to FIG. 2, a terminal A having a high robustness or error correction level X is connected via the IWF 31 to a terminal B having a low robustness or error correction level Y. In this case, the IWF 31 is arranged to perform a level conversion such that the negotiation processing and the data transmission between the terminal A and the terminal B are adapted in such a manner that the negotiation information corresponding to the higher level X and the transmission information corresponding to the highest possible level between the IWF 31 and the terminal A received from the terminal A is converted to an information corresponding to the lower level Y and transmitted to the terminal B. Furthermore, the transmission and negotiation information corresponding to the lower level Y and received from the terminal B is converted to an information corresponding to the highest possible level which can be established between the IWF 31 and the terminal A, and transmitted to the terminal A. The highest possible level is defined by the maximum common level which can be supported by the IWF 31 and the terminal A.

Thus, in order to always guarantee the use of the maximum level of robustness measures or error correction schemes supported by the MS 1, independent of the capabilities at the fixed network multimedia terminal TE 5, the IWF 31 supports the above defined error correction levels 1 to 3 and adapts the transmission leg in the mobile network to the transmission leg in the fixed network.

It is to be noted that the above interworking principle may as well be applied in the case of different call setup negotiation signaling procedures which relate to different "levels" or protocol capabilities of the terminals A and B. In this case, the IWF 31 performs "level" conversion with respect to the protocol negotiations for a call setup, wherein the maximum possible protocol "level" or capability with respect to negotiation speed or resource requirements is assured in the respective transmission legs.

Figure 3:
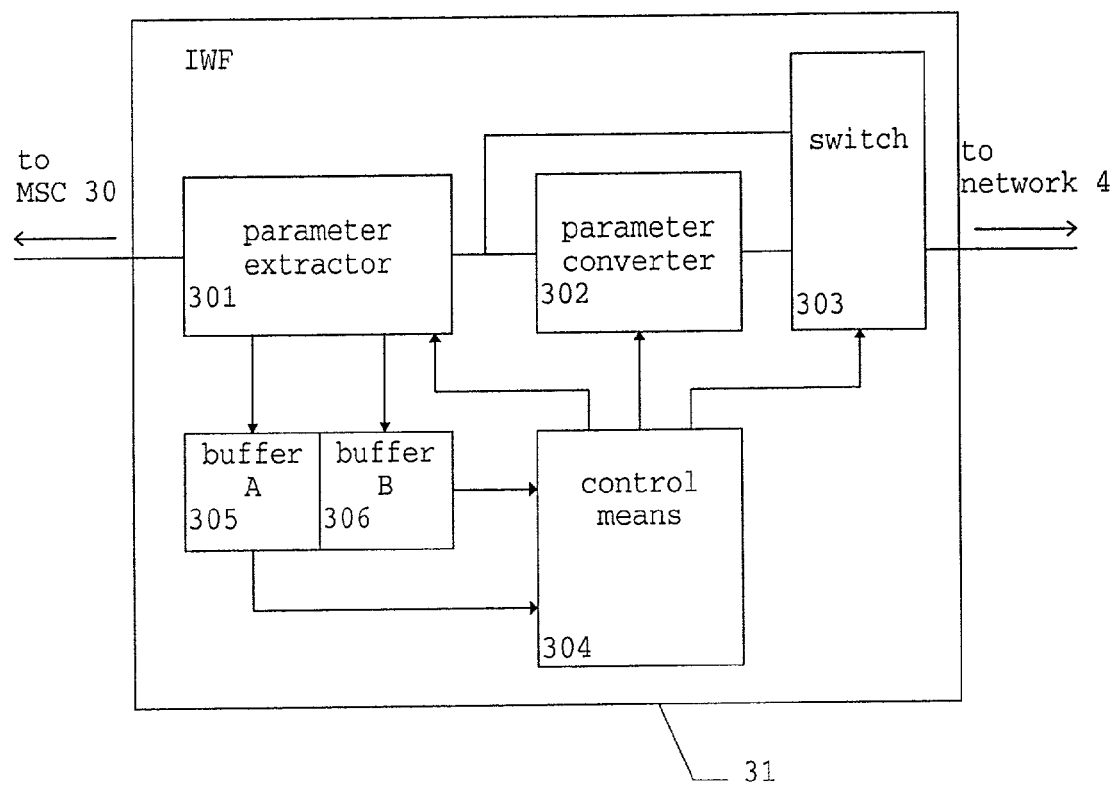
FIG. 3 shows a principle block diagram of a network element according to the preferred embodiment of the present invention.

A principle block diagram of the IWF 31 is shown in FIG. 3. According to FIG. 3, the IWF 31 comprises a parameter extractor 301 arranged to receive data transmitted from the mobile network or the fixed network. Furthermore, a switch 303 is provided, which initially connects the fixed network 4 directly via the upper line to the parameter extractor 301. Thereby, data received from both directions is directly transferred to the parameter extractor 301. Additionally, the switch 303 may switch the received data to a lower branch comprising a parameter converter 302 for performing the above described conversion of the level-related information.

Furthermore, a buffer A 305 and a buffer B 306 are provided for storing parameters relating to error correction levels or protocol parameters extracted and supplied by the parameter extractor 301. The buffer A 305 and the buffer B 306 are connected to respective input terminals of a control means 305 for controlling the operation of the IWF 31.

Figure 4:
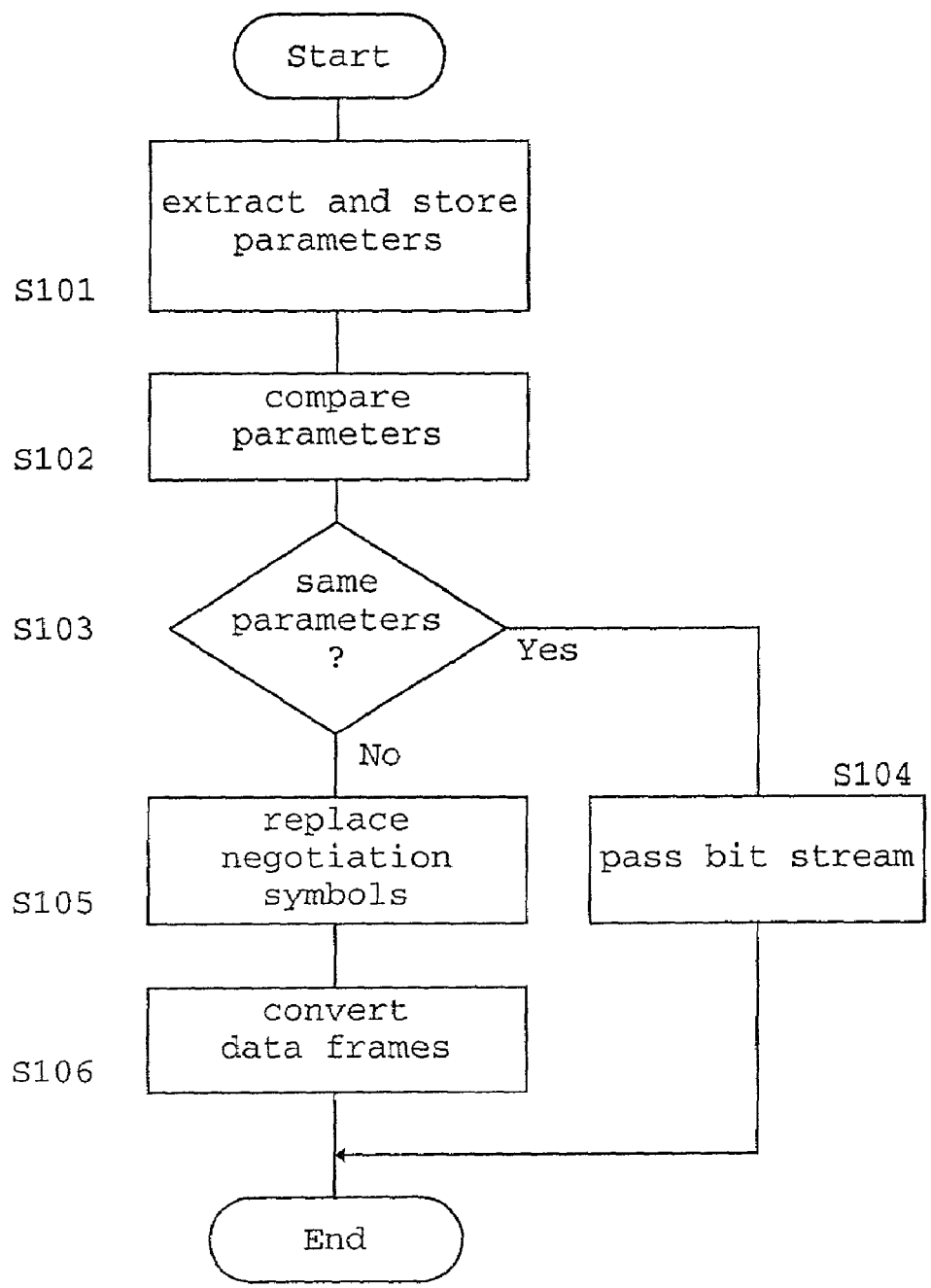
FIG. 4 shows a flow diagram of the interworking method according to the preferred embodiment of the present invention.

In the following, an errors correction adaptation operation of the IWF 31 is described on the basis of a flow diagram shown in FIG. 4 and indicating the processing performed by the control means 304.

In order to always guarantee a maximum level of error correction supported by the MS 1 independent of the capabilities of the TE 5, the IWF 31 supports the H-324 and H-223 error correction measures and is arranged to adapt the mobile leg, i.e. connection between the MS 1 and the IWF 31, to the fixed network leg, i.e. connection from the IWF 31 to the TE 5, by using the parameter converter 302.

Initially, the control means 304 controls the parameter extractor 301 so as to monitor incoming error correction level negotiation data received from the MS 1 and via the switch 301 from the TE 5, and to extract and discard the negotiation symbols until the symbols from both legs have been received. The extracted negotiation symbols received from the MS 1 and the TE 5 are stored in a respective one of the buffers A 305 and B 306 (S101).

Then, the negotiation symbols are supplied from the buffer A 305 and the buffer B 306 to the respective input terminals of the control means 304 which compares the received negotiation symbols (S102). Then, the control means 304 determines in step S103 whether both parties support the same level, i.e. whether the extracted parameters (negotiation symbols) indicate the same levels. If so, the control means controls the switch 303 so as to maintain the selection of the upper branch by-passing the parameter converter 302, and the bit stream received from both legs is passed without any adaptation of the error correction levels (S104).

If the comparison of the extracted parameters (negotiation symbols) indicates different error correction levels, the control means 304 controls the switch 303 so as to switch to the lower branch connected to the parameter converter 302, so as to connect the received data streams to the parameter converter 302. Then, the control means 304 controls the parameter converter 302 so as to replace the lower level negotiation symbols with symbols of the highest common level supported by the IWF 31 and the higher level party towards the higher level party, and to replace the higher level negotiation symbols with the lower level negotiation symbols towards the lower level party.

During the subsequent data processing, the higher level party applies the negotiated highest common level error correction and the lower level party applies its lower level error correction, wherein the control means 304 controls the parameter converter 302 so as to convert the highest common level data frames received from the higher level party into data frames corresponding to the lower level error correction scheme, before transmitting them to the lower level party. Furthermore, the parameter converter 302 is controlled by the control means 304 so as to convert the lower level data frames received from the lower level party into data frames corresponding to the data correction scheme of the highest common level supported by the IWF 31 and the higher level party (S106).

Alternatively, the parameter converter 302 may be controlled so as to replace the higher level negotiation symbols by level 0 negotiation symbols, i.e. negotiation symbols indicating the lowest available error correction level, towards the lower level party. In this case, the parameter converter 302 is arranged to convert the highest common level data frames received from the higher level party into level 0 data frames, i.e. data frames corresponding to the lowest available error correction level, before transmitting them to the lower level party. Thus, the lower level party generates level 0 data frames and transmits them to the IWF 31 in which the parameter converter 302 is controlled so as to convert the received level 0 data frames into data frames corresponding to the error correction scheme of the highest common level of the IWF 31 and the higher level party, before transmitting them to the higher level party.

Thus, if one of the parties (most probably the MS 1) supports one of the above defined error correction levels 1 to 3, and the other party does not support any error correction level, i.e. supports only the default level 0, the parameter converter 302 replaces the level 0 negotiation symbols with the symbols of the highest common level of the IWF 31 and the higher level party towards the higher level party, and the higher level negotiation symbols by the level 0 symbols towards the party supporting only the default level 0. Then, the parameter converter 302 converts the subsequently received data frames corresponding to the negotiated highest common level and received from the higher level party into level 0 data frames, before transmitting them to the level 0 party. Correspondingly, the parameter converter 302 converts the level 0 data frames received from the level 0 party into data frames corresponding to the highest common level, before transmitting them to the higher level party.

Accordingly, the IWF 31 is arranged to replace the negotiation symbols during the initial error correction level negotiation, such that both transmission parties may initiate a corresponding error correction scheme. Then, during the subsequent data transmission, the IWF 31 converts the received data frames, which may be video or multimedia frames, in accordance with the different negotiated error correction levels. If both transmission parties support the same error correction level, no adaptation processing is required, and the IWF 31 passes the data stream.

Consequently, a fixed terminal connected to a relatively error-free network does not require a high error correction level as provided in a mobile terminal connected to a radio interface having a relatively high error rate.

In the following, an adaptation operation of the IWF 31 for adapting various video phone implementations (e.g. analog H.324, digital H.324, or various coding schemes) is described on the basis of the principle block diagram shown in FIG. 3.

In case of a mobile originated call (MOC), the MSC 30 receives a call setup from the MS 1. Most probably, the setup parameters indicate that a video call is requested. Thus, the MSC 30 hunts an IWF resource with both a modem capability and a digital UDI (Unrestricted Digital Information) capability. The IWF 31 synchronizes the mobile traffic channel in order to be able to receive/monitor a possible ITU-T V.140 negotiation transmitted by the MS 1. This is performed by means of the parameter extractor 301. Alternatively, the MSC 30 may receive an indication of a V.140 support of the MS 1 in the setup signaling.

If the MS 1 sends a V.140 negotiation in the mobile traffic channel, the control means 304 of the IWF 31 controls the parameter converter 302 so as to generate a V.8/V.8bis handshaking and to forward both, i.e. V.140 and V.8/V.8bis, towards the fixed network 4 in a 64 kbit/s bit stream as described in ITU-T V.140.

If the MS 1 does not send a V.140 negotiation, the control means 304 determines a missing indication of V.140 in the mobile network signaling received from the MSC 30, based on the extracted and stored output value of the parameter extractor 301. Alternatively, the control means 304 may be arranged to monitor the traffic channel from the MS 1 with a timer function. Then, the control means 304 controls the parameter converter 302 to generate both the V.140 and the V.8/V.8bis handshaking and to forward both towards the fixed network 4 in a 64 kbit/s bit stream as described in ITU-T V.140.

If the control means 304 determines on the basis of the extracted and stored output value of the parameter extractor 301 that the called far end video terminal 5 (or corresponding IWF) replies with a V.8/V.8bis signaling, the parameter converter 302 is controlled so as to setup a 3.1 kHz H.324 video call.

If a V.140 signaling from the far end video terminal 5 is determined, the parameter converter 302 is controlled so as to by-pass any modem functions. In case the MS 1 also supports V.140, the control means 304 controls the switch 303 so as to by-pass the parameter converter 302, such that the V.140 negotiation is transparently transmitted between the MS 1 and the far end video terminal 5.

In case the MS 1 does not support V.140, the parameter converter 302 is controlled so as to generate possible further V.140 negotiation messages (with default parameters) towards the far end video terminal 5, to thereby setup the video call with UDI.

In case of a mobile terminated call (MTC), the MSC 1 receives call setup parameters (BCIE, possibly LLC and HLC) either from the HLR (Home Location Register) or from the fixed network 4 (and the HLR), depending on the signaling used in the transmission leg of the fixed network 4. Most probably, the setup parameters indicate that a video call is requested, and the MS 1 receives this indication in the call setup.

After a (positive) response to the setup from the MS 1, the MSC 30 hunts an IWF resource with both a modem capability and a UDI capability. The IWF 31 synchronizes the mobile traffic channel in order to be able to monitor and forward a possible V.140 negotiation message received from the fixed network 4. This is performed by means of the parameter extractor 301.

If the IWF 31 receives a V.140 message from the fixed network 4 and the control means 304 determines no indication of the V.140 capabilities from the MS 1, the control means 304 of the IWF 31 controls the parameter converter 302 so as to forward the V.140 message to the MS 1 and starts a timer. If no response to the V.140 message is determined by the control means 304, based on the extracted and stored output value of the parameter extractor 301, before the expiration of the timer, the control means 304 controls the parameter converter 302 so as to by-pass the modem functions and to respond itself (with default parameters) to the V.140 message in order to setup the video call with UDI. If the control means 304 determines on the basis of the extracted and stored output value of the parameter extractor 301 that the MS 1 responds to the V.140 negotiation, the control means 304 controls the switch 303 so as to by-pass the parameter converter 302, such that the V.140 negotiation is transparently transmitted between the MS 1 and the far end video terminal 5. In this case, the whole connection will be set up with UDI.

If, otherwise, the IWF 31 receives a V.140 message from the fixed network 4 and the control means 304 determines an indication of the V.140 capabilities from the MS 1, the control means 304 of the IWF 31 controls the parameter converter 302 so as to by-pass the the parameter converter 302, such that the V.140 negotiation is transparently transmitted between the MS 1 and the far end video terminal 5.

If, otherwise, the IWF 31 receives a V.140 message from the fixed network 4 and the control means 304 determines an indication that the MS 1 does not support V.140, the control means 304 controls the parameter converter 302 so as to by-pass the modem functions and to respond itself (with default parameters) to the V.140 message in oder to setup the video call with UDI.

In all the above three cases, the modem function of the IWF 31 is by-passed upon setting up the UDI channel to/from the fixed network.

If the negotiation ends up with a 15 kbit/s (or a 56 kbit/s in a 56 kbit/s system) bit transparent UDI connection, the IWF 31 may be by-passed after the negotiation phase.

If the far end video terminal 5 sends only a V.8/V.8bis signaling, the IWF 31 responds to that, and a 3.1 kHz (modem) H.324 video call is set up.

Thus, in general, the inband negotiation procedures are divided between the MS 1 and the IWF 31. The IWF 31 performs the analog/modem negotiation with the far end video terminal 5. Thereby, a H.324 video call is indicated as a minimum requirement in the negotiation. The MS 1 performs a V.140 negotiation with the far end video terminal 5 in order to agree on video specific features such as a video coding protocol. The IWF 31 monitors the possible V.140 negotiation between the MS 1 and the far end terminal 5, in order to determine whether the far end terminal 5 supports digital transmission (UDI) so as to be able to by-pass modem functions in a UDI case. If the MS 1 does not support V.140 negotiation, the IWF 31 replaces the MS 1 as a V.140 negotiation partner with the far end terminal 5, in order to be able to set up the fixed network connection with UDI, i.e. without modems.

Accordingly, an IWF resource with both a modem capability and a UDI capability is reserved for the call during call setup. In practice, this means that the call is set up as a data call (Video call or Synchronous Transparent Circuit Switched call). This means that an integrated IWF pool is available at the MSC 30.

Thus, a simple solution is offered for adapting various video phone implementations between mobile and fixed network terminals and for setting up a video call with UDI, i.e. without modems, through mobile networks even in cases where the terminals are not able to negotiate on the UDI capability with inband procedures.

Thereby, current and forthcoming compatibility problems can be solved and the compatibility and quality of mobile data or video/multi-media calls can be improved.

It is to be noted, that the processing of the IWF 31 may be performed by a micro processor such as a CPU based on a control program, wherein the respective blocks 301 to 303 are replaced by corresponding software features, and wherein the buffers A 305 and B 306 may be included in a RAM allocated to the CPU.

Furthermore, the error correction and negotiation processings described in the preferred embodiment may be performed in any network element and are not restricted to the IWF 31 of a mobile network. The error processing and negotiation can be performed in any data or multimedia network where terminals supporting different protocol features are used.

In summary, the invention relates to an interworking method and apparatus for a data connection between a first terminal supporting a first processing scheme and a second terminal supporting a second processing scheme, wherein the first and second processing schemes are checked, and the first processing scheme is adapted to the second processing scheme, when the checking indicates that the first processing scheme is not supported by the second terminal. Thus, a mapping is performed and different processing capabilities are used on different portions of the data connection.

The above description of the preferred embodiment and the accompanying drawings are only intended to illustrate the present invention. The preferred embodiment of the invention may vary within the scope of the attached claims.

What is claimed is:

1. An interworking method for a data connection between a first network element terminal supporting a first processing scheme and a second terminal supporting a second processing scheme, comprising the steps of:
   monitoring by an interim network element locating between the first and the second terminals the negotiation on a processing scheme between the first and the second terminals,
   detecting that the second terminal does not support a first processing scheme proposed by the first terminal, and
   providing by the interim network element an interworking function for adapting the first processing scheme to a second processing scheme supported by the second terminal,
   wherein said first and second processing schemes correspond to first and second error correction schemes, and
   wherein said providing step comprises replacing a negotiation symbol indicating said first error correction scheme by a negotiation symbol indicating said second error correction scheme, and replacing a negotiation symbol indicating said second error correction scheme by a negotiation symbol indicating the highest common error correction scheme supported by said first terminal and said interworking function.

2. A method according to claim 1, wherein said monitoring step comprises extracting negotiation symbols indicating said first or second processing schemes during a negotiation processing between said first and second terminals, and comparing said extracted negotiation symbols.

3. A method according to claim 1, further comprising the step of passing a bit stream via said data connection without adaptation, when said detecting step indicates that said first and second processing schemes are the same schemes.

4. A method according claim 1, wherein the first and second processing schemes correspond to first and second call setup negotiations.

5. A method according to claim 4, wherein said first call setup negotiation is an analog setup negotiation via a modem, and said second call setup negotiation is digital setup negotiation.

6. A method according to claim 1, wherein said providing step comprises converting data frames comprising said highest common error correction scheme into data frames comprising said second error correction scheme, and converting data frames comprising said second error correction scheme into data frames comprising said highest common error correction scheme supported by said first terminal and said interworking function.

7. A method according to claim 1, wherein said data connection is a multimedia connection.

8. An interworking method for a data connection between a first network element terminal supporting a first processing scheme and a second terminal supporting a second processing scheme, comprising the steps of:
   monitoring by an interim network element locating between the first and the second terminals the negotiation on a processing scheme between the first and the second terminals;
   detecting that the second terminal does not support a first processing scheme proposed by the first terminal; and
   providing by the interim network element an interworking function for adapting the first processing scheme to a second processing scheme supported by the second terminal, wherein said first and second processing schemes correspond to first and second error correction schemes, and wherein said providing step comprises replacing a negotiation symbol indicating said first error correction scheme by a negotiation symbol indicating the lowest available error correction scheme, and replacing a negotiation symbol indicating said second error correction scheme by a negotiation symbol indicating the highest error correction scheme supported by said first terminal and said interworking function.

9. A method according to claim 8, wherein said providing step comprises converting data frames comprising said highest common error correction scheme into data frames comprising said lowest available error correction scheme, and converting data frames comprising said lowest available error correction scheme into data frames comprising said highest common error correction scheme supported by said first terminal and said interworking function.

10. An interworking apparatus for performing an interworking processing in a data connection between a first terminal supporting a first processing scheme and a second terminal supporting a second processing scheme and locating between the first and the second terminals, comprising:
    monitoring means for monitoring the negotiation on a processing scheme between the first and the second terminals,
    detecting means for detecting that the second terminal does not support a first processing scheme proposed by the first terminal, and
    providing means for providing an interworking function for adapting the first processing scheme to a second processing scheme supported by the second terminal,
    wherein said first and second processing schemes correspond to first and second error correction schemes, and
    wherein said providing means comprises a conversion means for replacing a negotiation symbol indicating said first error correction scheme by a negotiation symbol indicating said second error correction scheme and for replacing a negotiation symbol indicating said second error correction scheme by a negotiation symbol indicating the highest common error correction scheme supported by said first terminal and said error correction apparatus.

11. An apparatus according to claim 10, wherein said monitoring means comprises an extracting means for extracting an information indicating said first or second processing scheme during a negotiation step between said first terminal and said second terminal, and a comparing means for comparing said first and second processing schemes based on said extracted information.

12. An apparatus according to claim 11, further comprising a buffer means for storing said information indicating said first and second processing schemes, wherein said comparing means is arranged to read said information indicating said first and second processing schemes from said buffer means.

13. An apparatus according to claim 10, further comprising switching means for by-passing said providing means, when said detecting means determines that the first processing scheme is supported by the second terminal.

14. An apparatus according to claim 10, wherein said first and second processing schemes correspond to first and second call setup negotiations.

15. An apparatus according to claim 14, wherein said first call setup negotiation is an analog setup negotiation via a modem, and said second call setup negotiation is digital setup negotiation.

16. An apparatus according to claim 10, wherein said conversion means is arranged to convert data frames comprising said highest common error correction scheme into data frames comprising said second error correction scheme, and to convert data frames comprising said second error correction scheme into data frames comprising said highest common error correction scheme supported by said first terminal and said error correction apparatus.

17. An apparatus according to claim 10, wherein said interworking apparatus is a network element having an interworking function.

18. An apparatus according claim 10, wherein said data connection is a multimedia connection.

19. An interworking apparatus for performing an interworking processing in a data connection between a first terminal supporting a first processing scheme and a second terminal supporting a second processing scheme and locating between the first and the second terminals, comprising:
    monitoring means for monitoring the negotiation on a processing scheme between the first and the second terminals;
    detecting means for detecting that the second terminal does not support a first processing scheme proposed by the first terminal; and
    providing means for providing an interworking function for adapting the first processing scheme to a second processing scheme supported by the second terminal, wherein said first and second processing schemes correspond to first and second error correction schemes, and wherein said providing means comprises a conversion means for replacing a negotiation symbol indicating said first error correction scheme by a negotiation symbol indicating the lowest available error correction scheme, and for replacing a negotiation symbol indicating said second error correction scheme by a negotiation symbol indicating the highest common error correction scheme supported by said first terminal and said error correction apparatus.

20. An apparatus according to claim 19, wherein said conversion means is arranged to convert data frames comprising said highest common error correction scheme into data frames comprising said lowest available error correction scheme, and to convert data frames comprising said lowest available error correction scheme into data frames comprising said highest common error correction scheme supported by said first terminal and said error correction apparatus.

* * * * *